United States Patent [19]

Robertson

[11] Patent Number: 4,498,929
[45] Date of Patent: Feb. 12, 1985

[54] STABLE DISPERSIONS OF POLYISOCYANATES CONTAINING POLYSILOXANE MOLD RELEASE AGENTS

[75] Inventor: John R. Robertson, Glenn Mills, Pa.

[73] Assignee: ICI Americas Inc., Wilmington, Del.

[21] Appl. No.: 582,019

[22] Filed: Feb. 21, 1984

Related U.S. Application Data

[63] Continuation-in-part of Ser. No. 486,269, Apr. 18, 1983, abandoned.

[51] Int. Cl.³ .............................................. B28B 7/36
[52] U.S. Cl. ................................. 106/38.2; 264/300; 264/338; 528/28; 528/29; 524/262; 524/265; 524/267
[58] Field of Search ................. 264/300, 338; 528/28, 528/29; 524/262, 265, 267; 106/38.2

[56] References Cited

U.S. PATENT DOCUMENTS

| | | | |
|---|---|---|---|
| 3,993,606 | 11/1976 | Bonin et al. | 264/300 |
| 4,024,090 | 5/1977 | Bonin et al. | 264/300 |
| 4,457,887 | 7/1984 | Porsche | 528/49 |

FOREIGN PATENT DOCUMENTS 117524  7/1982  Japan ................................... 528/28

Primary Examiner—Melvyn I. Marquis
Attorney, Agent, or Firm—Richard A. Rowe

[57] ABSTRACT

The invention is directed to a liquid polyisocyanate dispersions containing an unreacted polysiloxane mold release agent which has isocyanate reactive groups. Specifically, the invention is directed to polyol modified diphenylmethane diisocyanates having dispersed therein a polysiloxane compound having pendant organic chains which contain at least one hydroxyl, amino or carboxyl functional group and a silicone dispersing or inhibiting agent substantially free of isocyanate reactive groups.

22 Claims, No Drawings

STABLE DISPERSIONS OF POLYISOCYANATES CONTAINING POLYSILOXANE MOLD RELEASE AGENTS

This is a continuation-in-part of application Ser. No. 486,269 filed Apr. 18, 1983 now abandoned.

The invention is directed to stable dispersions of polysiloxane mold release agents in liquid aromatic polyisocyanates. Specifically, the invention is directed to polysiloxanes with pendant organic groups having functional hydroxyl, amino, mercapto or carboxyl groups which are dispersed in liquid organic polyisocyanates using silicone surfactants which inhibit their isocyanate reactivity.

These dispersions are especially useful in manufacturing shaped resin components by the reaction injection molding process (RIM) wherein a liquid stream of polyisocyanate is impingement mixed with at least one other stream of active hydrogen containing organic liquids and catalysts and then forced into a heated metal mold to cure.

The preparation of molded articles by the RIM process is an established and growing industry, especially in the automotive industry. Soft fascia and/or bumper covers are used on more than 60% of cars manufactured today and the usage is growing. As the use grows, however, economics of scale make other processes, such as injection molding, become more competitive, even for large parts such as automotive fascia. It is therefore necessary to make the already efficient RIM process even faster and more economical to operate and one of the areas in which this can be carried out most effectively is in the reduction or elimination of the need for application of mold release agent to the mold before each part is made.

Recent developments in the chemistry of the polymer systems have resulted in urethane and urethane-urea polymers which are sufficiently cured to be demolded within 20-30 seconds after injection. RIM equipment has improved so that the mechanics of opening and closing the mold also require only 30-40 seconds. Urethane polymers are excellent adhesives and bond tenaciously to metal so it is necessary to apply a release agent to the mold surface so that the parts can be easily and quickly removed without damage or distortion. The molds are complex and must be completely and uniformly covered, usually by spraying a solution or emulsion of soap or wax. This procedure requires 30-60 seconds and must be done at least after every 3-5 parts and more often after each part, thus increasing the part to part cycle time by as much as 50%. In addition, this constant spraying and respraying causes excessive mold release to build up on the areas immediately surrounding the mold surface and on areas where release is relatively easy, so that some release agent is left on the mold surface, as well as areas where excess release agent is inadvertently applied excessive release agent builds up on the mold surface causing "scumming" and loss of gloss of the molded part. This means that periodically the mold must be wiped off, to remove excess release agent and, about once every 150 to 200 parts, must be completely cleaned, by solvent or detergent wash, wiped down, and the surface reprepared for molding. This can consume more than one hour per shift and thus add another 20 seconds or 10-20% of the time required to mold each part. Furthermore, the external release agent is, obviously, removed from the mold because it adheres to the molded part and must be washed off the part before it is painted, thus providing a possible source for part quality problems.

Clearly, the elimination or reduction of the need to apply external release agent could reduce the present cycle time by 50% or more, thus increasing productivity and reducing unit cost. In addition, it would reduce quality problems by reducing surface blemishes resulting from build up of release agent on the mold and by reducing paint rejects by reducing the amount of external release agent left on the surface of each part.

While the internal mold release agent dispersions of this invention can provide easy removal from an untreated mold surface at least for several parts, more efficient operation can be achieved by treating the mold surface with a standard release agent first and then again after about 10 to about 50 parts, depending on the urethane polymer in which it is employed as well as the part complexity, are made. The external agent is then reapplied and 10 to about 50 parts are again made, and so forth. The cycle time per part is thus dramatically reduced and, since less frequent applications of external release agent is required, the frequency of minor and major mold cleaning is also markedly decreased. In addition quality problems due to build up of release agent on the mold and transfer of release agent to the part are reduced. Thus the total production of quality parts during a given time period is again increased.

An object of the invention is to provide an improved polyisocyanate fluid dispersion which comprises a silicone surfactant and certain polysiloxane mold release agents having pendant organic chains which have at least one functional hydroxyl, mercapto, amino or carboxyl group. Another object of the invention is to provide a RIM process for making polyurethanes and polyurea moldings where the unit time per molding is decreased by using the polyisocyanate and polysiloxane dispersion for reaction with polyols, and polyamine catalysts and other reactive ingredients.

These and other objects of the invention are accomplished by dispersing silicone surfactants and polysiloxane mold release agents in the liquid polyisocyanate to form stable fluid dispersions which do not gel over long periods of time when stored at temperatures of 20° to 25° C. These dispersions are preferably made by adding the silicone surfactant and isocyanate reactive polysiloxane mold release agent to the liquid polyisocyanate employing high shear mixing equipment at room temperature. If ingredients are added separately it is preferred to add the surfactant to the polyisocyanate liquid before adding the isocyanate reactive polysiloxane mold release agent. Alternatively, the surfactant and polysiloxane mold release agent may be preblended before mixing with the isocyanate. In most instances stable liquid dispersions are obtained from blends which contain 1-15 percent by weight of the functional polysiloxane compound and based upon the weight of the polysiloxane mold release agent from 2-25 and preferably from 5-15 percent by weight of a silicone surfactant. Since these dispersions are not stable without the silicone surfactant it is theorized that the surfactant acts as an inhibitor agent for the isocyanate reactive groups in the polysiloxane mold release agent and that the surfactant silicone must be present in amounts sufficient to at least coat the mold release agent to inhibit reaction with the isocyanate at temperatures up to 25° C. It is important to mix the components with high shear mixing equipment especially since the polysiloxane mold release agent is substantially incompatible or insoluble in the polyisocyanate liquid.

The organic polyisocyanates that are useful in producing polyurethane products in accordance with this invention are organic compounds that contain at least two isocyanate groups. Such compounds are well known in the art. The preferred polyisocyanates used in the invention are aromatic derivatives which are liquids at room temperatures. Such materials are readily commercially available such as the isomers of toluenediisocyanate, diphenylmethane diisocyanate and methylene bridged polyphenylmethane polyisocyanates isophorane diisocyanate and hydrogenated derivatives of MDI. Many of the polyphenyl polymethylene polyisocyanates which are prepared by aniline formaldehyde condensations followed by phosgenation ("crude MDI") and polyisocyanates which contain carbodiimide groups, uretonimine groups, urethane groups, sulfonate groups, isocyanurate groups, urea groups or biuret groups. Derivatives containing small amounts of prereacted low molecular weight polyols such as butylene glycol and propylene glycol or hydroxy esters to form stable liquids are useful. Such combinations are readily available and well known in the urethane manufacturing art. Of particular interest to this invention are compositions containing the 2,4' and 4,4' diphenylmethane diisocyanate isomers which are quasi prepolymers containing 1–18% by weight or about 0.1–0.3 mol percent of polyols having a molecular weight of 75–700 and especially 75–200 such as propylene glycol, butylene, and poly-1,2-propylene ether glycols having a molecular weight of from 134 to 700. Of additional interest to the invention are carbodiimide, uretonimine modified derivatives of diphenylmethane diisocyanates which have been further modified by the addition of high molecular weight polyols such as polyether diols and triols having a molecular weight of 1000–8000. In general the polyol modified isocyanate have a free —NCO content of 15–47% by weight and more often 20–30%.

Typical polyisocyanates for use in the invention are exemplified but not limited to the following:

"Polyisocyanate 1" is made by prereacting pure diphenylmethanediisocyanate with 10% by weight of a polyol mixture containing 19 parts 1,2 propylene glycol, 22 parts 2,3 butylene glycol and 59 parts tripropylene glycol and the resultant product having 23% by weight free isocyanate commercially available as Rubinate® 179 isocyanate from Rubicon Chem.

"Polyisocyanate 2" is uretonimine modified 4,4' diphenylmethane diisocyanate having 29.3% free —NCO and a functionality of 2.1 which is further reacted with 1.3% by weight 1,3 butylene glycol to give a free isocyanate content of 27.4%.

"Polyisocyanate 3" is similar to "Polyisocyanate 1" made by reacting 18% by weight mixed polyols to a free isocyanate content of 15%.

"Polyisocyanate 4" is similar to "Polyisocyanate 2" made by reacting a uretonimine modified polyisocyanate having a free —NCO content of 31% further reacted with 1.3% by weight 1,2 propylene glycol to a free isocyanate content of 29.3%.

"Polyisocyanate 5" is similar to "Polyisocyanate 2" made by reacting 2% by weight of 1,2 propylene glycol to a free —NCO content of 27.4%.

"Polyisocyanate 6" is similar to "Polyisocyanate 2" made by prereacting with 2% by weight tripropylene glycol.

"Polyisocyanate 7" is similar to "Polyisocyanate 2" made by prereaction with 10% by weight of the polyol mixture described in "Polyisocyanate 1" to give an —NCO content of 20%.

"Polyisocyanate 8" is similar to "Polyisocyanate 7" using 5% by weight of the polyol mixture to give an —NCO content of 24.5%.

"Polyisocyanate 9" is similar to "Polyisocyanate 2" made by prereaction with 2% by weight 1,3 butylene glycol.

The blends of this invention are made by forming a dispersion of one or more polysiloxane mold release agent which consists essentially of 0.5–20 mol % of $R_a R'_b SiO_{[4-(a+b)]/2}$ units and from 99.5–80 mol % of $R''_c SiO_{(4-c)/2}$ units where R is an isocyanate reactive organic radical, a has an average value of from 1–3, R' and R'' are hydrocarbon radical or a substituted organic radical, b has an average value of 0–2, a+b is from 1–3, c has an average value from 1 to 3, and wherein (d) the ratio of the total molecular weight to the total number of isocyanate reactive functional groups in the polysiloxane molecule (equivalent weight) ranges from 100–3500.

(e) the combined formula weights of all isocyanate reactive organic radicals, R do not exceed 40% of the total molecular weight of the polysiloxane mold release agent;

(f) the combined formula weights of all nonisocyanate reactive radicals, R'+R'' together do not exceed 40% of the total molecular weight of the polysiloxane mold release additive;

(g) the combined formula weights of all the organic radicals R+R'+R'' in the molecule together do not exceed 55–60% of the total molecular weight of the molecule;

(h) the polysiloxane mold release agent(s) each contain an average of at least two isocyanate reactive functional groups per molecule;

(i) at least two of the isocyanate reactive functional groups in each molecule are located on separate organic radicals, R, attached independently to different silicon atoms in the polysiloxane molecule;

(j) the isocyanate reactive functional groups which may be employed in the polysiloxane molecule(s) are restricted to the following types:

(1) alcohols, (2) phenols, (3) thiols, (4) primary or secondary aromatic amines, which contain no oxygen, and have not more than one nitrogen atom attached directly to, in conjugation with, or incorporated within, the aromatic ring nucleus, (5) secondary aliphatic amines wherein at least one of the alkyl carbon atoms, bonded directly to the nitrogen atom, is not a primary carbon atom, (6) carboxylic acids.

The groups may be used independently or in any combination which is consistant with conditions listed above.

(k) the molecular weight of the polysiloxane mold release agent is between 1000 and 30,000, preferably 2000–15,000 and most preferred 4000–8000.

(l) the polysiloxane mold release agent is substantially insoluble in liquid polyisocyanates especially those named above.

In these mold release agents the hydroxy, mercapto, or amino organic R radicals having preferably a molecular weight is the range of 100–400 can be attached to the silicon atom directly to carbon or through oxygen, nitrogen or sulfur carbon bonds. Particularly preferred R radicals are those of the formula HO—R'''—, $H_2N$—R'''—, $HNR_2'''$, HS—R'''—, wherein R''' is a divalent linking group composed of carbon and hydrogen; carbon, hydrogen and oxygen; carbon, hydrogen and sulfur; carbon, hydrogen and nitrogen; or carbon, hydrogen, oxygen and nitrogen. Specific examples of R''' include the methylene, ethylene, propylene, hexamethylene, decamethylene, —$CH_2CH(CH_3)$—$CH_2$—, phenylene, butyl phenylene, naphthylene, —$CH_2CH_2SCH_2CH_2$—, —$CH_2CH_2OCH_2$—, —$CH_2CH_2$—$CH_2$—$O(CH_2$—$CHR'O)_n$—, where n is 0–5 where R' is described as above or H, a preferred R group is —$CH_2CH_2CH_2O(CH_2CH(CH_3)O)_nH$ where n=1–5 having an hydroxyl equivalent weight of 500–2000. It is preferred that the R''' linking group contains from 3–10 atoms in addition to hydrogen atoms. There can be from 1–33 functional R radicals, preferably 3–10, and from 1–3 attached to a silicon atom.

As indicated above, the R' radical can be any hydrocarbon or substituted organic radical. Illustrative of the R' radicals that can be present are alkyl radicals such as the methyl, ethyl, propyl, butyl amyl, hexyl, octyl, decyl, dodecyl, and octadecyl, and myricyl radicals, alkenyl radicals such as the vinyl, allyl, and hexenyl radicals; cycloalkyl radicals such as the cyclobutyl and cyclohexyl radicals; aryl radicals such as the phenyl, xenyl and naphthyl radicals; aralkyl radicals such as the benzyl and 2-phenylethyl radicals; alkaryl radicals such as the tolyl, xylyl and mesityl radicals; the corresponding halohydrocarbon radicals such as 3-chloropropyl, 4-bromobutyl, 3,3,3-trifluoropropyl, chlorocyclohexyl, bromophenyl, chlorophenyl, alpha,alpha,alphatrifluorotolyl and the dichloroxenyl radicals; the corresponding cyanohydrocarbon radicals such as 2-cyanoethyl, 3-cyanopropyl and cyanophenyl radicals; the corresponding radicals such as ether and ester hydrocarbon radicals such as —$(CH_2)_3OC_2H_5$, —$(CH_2)_3OCH_3$, —$(CH_2)_3COOC_2H_5$, and $(CH_2)_3COOCH_3$, the corresponding thioether and thioester hydrocarbon radicals such as —$(CH_2)_3SC_2H_5$ and —$(CH_2)_3COSCH_3$; and nitrohydrocarbon radicals such as the nitrophenyl and 3-nitropropyl radicals. It is preferred that the R' radical be an organic radical containing from 1 to 10 atoms. In the most preferred embodiment of this invention at least 90 percent of all the R' radicals are methyl radicals. There can be an average of from 0 to 2 R' radicals attached to the silicon atom, i.e., b has an average of from 0 to 2 in the above formula.

The R'' radical in the functional isocyanate reactive siloxanes of this invention can also be any hydrocarbon or substituted hydrocarbon radical. The illustrative examples given with respect to R' above are equally applicable here and are not repeated for the sake of brevity. Likewise, the preferences set forth for R' above also apply to the R'' radical. There can be from 0 to 3 R'' radicals, on the average, per silicon atom, i.e., c has an average value of from 1 to 3 in the above formula.

These polysiloxane mold release agents are made by well known techniques and are usually formed by grafting an olefin containing organic modifying group or polyoxyalkylene oxide onto a "methylhydrogen siloxane" modified polydimethylsiloxane using a platinum catalyzed hydrolisation reaction.

The functional siloxanes of the mold release agent can be either solid or liquid in form and are required to be substantially insoluble in isocyanate liquid under RIM operating conditions. In order to use a solid functional siloxane it would be necessary to dissolve, disperse or suspend the siloxane in one or more silicone surfactants. Hence it is much preferred that the functional siloxane employed be in liquid form. While the viscosity of the liquid siloxane can vary over a wide range, for example from 1 to 100,000 cs., it is generally preferred that the viscosity be in the range of from 50 to 1000 cs. Molecular weight can vary from 1000 to 30,000, preferably 2000–20,000 and most preferred 4000–8000.

The formulations of the invention include from 1–15 percent by weight of a polysiloxane such as those included in the above described definition and specifically but not limited to those in the following list having $R_aR'_bSiO_{[4-(a+b)]/2}$ units and $R''_cSiO_{[4-c]/2}$ units and wherein the value listed for (d) is the equivalent weight, (e) is the combined formula weights or reactive radicals R expressed as percent of the molecular weight, (f) is the combined formula weights of non-isocyanate reactive groups R'+R'' expressed as percent of the molecular weight:

"Polysiloxane I" is a hydroxy functional polysiloxane polyether copolymer internal mold release agent having the approximate formula:

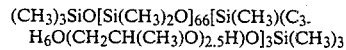
$(CH_3)_3SiO[Si(CH_3)_2O]_{66}[Si(CH_3)(C_3H_6O(CH_2CH(CH_3)O)_{2.5}H)O]_3Si(CH_3)_3$ having a molecular weight of about 6000, a hydroxy equivalent weight (d) of 2000, (e) is 13%, (f) is 35%, and a viscosity of 160 centistokes.

"Polysiloxane II" is a hydroxy functional thioether copolymer internal mold release agent having the speculative formula:

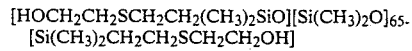
$[HOCH_2CH_2SCH_2CH_2(CH_3)_2SiO][Si(CH_3)_2O]_{65}[Si(CH_3)_2CH_2CH_2SCH_2CH_2OH]$ having a hydroxy equivalent weight (d) of 2750, a molecular weight of 5500, a value for (e) of 4.7%, (f) is 37% and a viscosity of about 55 centistokes.

"Polysiloxane III" has a general formula as follows:

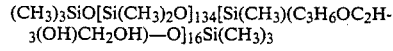
$(CH_3)_3SiO[Si(CH_3)_2O]_{134}[Si(CH_3)(C_3H_6OC_2H_3(OH)CH_2OH)—O]_{16}Si(CH_3)_3$ a molecular weight 13,136, (d) equivalent weight of 411, (e) is 16% and (f) is 33%.

"Polysiloxane IV" has a general formula as follows:

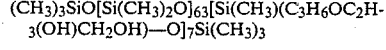
$(CH_3)_3SiO[Si(CH_3)_2O]_{63}[Si(CH_3)(C_3H_6OC_2H_3(OH)CH_2OH)—O]_7Si(CH_3)_3$ a molecular weight 6,154, (d) equivalent weight 440, (e) is 15%, and (f) is 34%.

"Polysiloxane V" has a general formula:

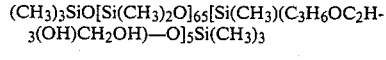
$(CH_3)_3SiO[Si(CH_3)_2O]_{65}[Si(CH_3)(C_3H_6OC_2H_3(OH)CH_2OH)—O]_5Si(CH_3)_3$ a molecular weight of 6068, (d) equivalent weight 607, (e) is 11%, and (f) is 35%.

"Polysiloxane VI" has a general formula:

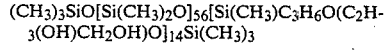
$(CH_3)_3SiO[Si(CH_3)_2O]_{56}[Si(CH_3)C_3H_6O(C_2H_3(OH)CH_2OH)O]_{14}Si(CH_3)_3$ a molecular weight of 6980, (d) equivalent weight 249, (e) is 26%, and (f) is 28%.

"Polysiloxane VII" has a general formula:

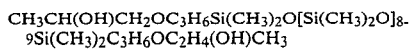
$CH_3CH(OH)CH_2OC_3H_6Si(CH_3)_2O[Si(CH_3)_2O]_{8-9}Si(CH_3)_2C_3H_6OC_2H_4(OH)CH_3$ a molecular weight of 6962, (d) an equivalent weight of 3481, (e) is 3.7%, and (f) is 39%.

"Polysiloxane VIII" has a general formula:

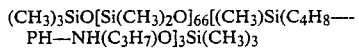
$(CH_3)_3SiO[Si(CH_3)_2O]_{66}[(CH_3)Si(C_4H_8-PH-NH(C_3H_7)O]_3Si(CH_3)_3$ where PH = phenylene, a molecular weight of 5782, and equivalent weight (d) of 3481, (e) is 9.9% and (f) is 37%.

"Polysiloxane IX" has a general formula:

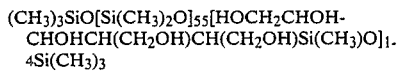
$(CH_3)_3SiO[Si(CH_3)_2O]_{55}[HOCH_2CHOH-CHOHCH(CH_2OH)CH(CH_2OH)Si(CH_3)O]_{14}Si(CH_3)_3$ a molecular weight of 7550, an equivalent weight (d) of 108, (e) is 33% and (f) is 26%.

"Polysiloxane X" has a general formula:

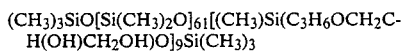
$(CH_3)_3SiO[Si(CH_3)_2O]_{61}[(CH_3)Si(C_3H_6OCH_2CH(OH)CH_2OH)O]_9Si(CH_3)_3$ a molecular weight of 6390, an equivalent weight (d) of 355, (e) is 19% and (f) is 32%.

"Polysiloxane XI" has a general formula:

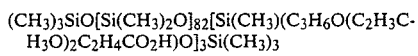
$(CH_3)_3SiO[Si(CH_3)_2O]_{82}[Si(CH_3)(C_3H_6O(C_2H_3CH_3O)_2C_2H_4CO_2H)O]_3Si(CH_3)_3$ The silicone surfactants which are used as dispersing agents and inhibitors for the polysiloxane mold release agent containing polyisocyanate liquid dispersions of the invention are modified polydialkyl siloxane polymers especially polydimethylsiloxanes. These materials are well known and readily commercially available in numerous modifications having side chains linked to the silicon atoms through linking groups composed of carbon and hydrogen; carbon, hydrogen and oxygen; carbon, hydrogen and sulfur; carbon, hydrogen and nitrogen; or carbon, hydrogen, oxygen and nitrogen. Those which are substantially stable to moisture are preferred. For the most part these silicone surfactants are made by grafting on organic side chains.

Silicone surfactants generally conform to the general formula:

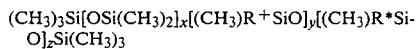
$(CH_3)_3Si[OSi(CH_3)_2]_x[(CH_3)R^+SiO]_y[(CH_3)R^*SiO]_zSi(CH_3)_3$ where the value of x, y or z vary from 10–1000 and where R+ and R* may be the same or different and be selected from alkyl pendant radicals such as polyalkyl ether or alkoxyether groups such as $-CH_2CHRO(CH_2-CHRO)_m-C_mH_{2m+1}$ or $-OCH_2CHRO(CH_2CHRO)_m-C_nH_{2n+1}$ where R is H, $-CH_3$, $-C_2H_5$ where the sum of m+n is such that the total formula weight of the polyoxyalkylene block and other grafted radicals ranges from 800–40,000, the polysiloxane block ranges from 15–70% of the molecular weight and n is 1–5; or grafted monovalent radicals selected from methoxy, ethoxy, ethylene, styrene, trifluoropropene, allyltetrahydrofurfuryl ether, allyloxyethyl acetate, acrolein diethylacetal, allylcyanide, allyloxyethyl cyanide, allylmorpholine, allylchloride and others.

Surfactants of particular interest for use in the invention are polydimethylsiloxanepoly (polyethylene oxide/polypropylene oxide) block copolymers having the general formula:

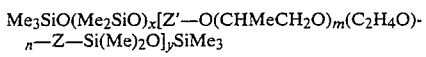
$Me_3SiO(Me_2SiO)_x[Z'-O(CHMeCH_2O)_m(C_2H_4O)_n-Z-Si(Me)_2O]_ySiMe_3$ where Me = $CH_3$, x is 42–125; y is 3–15; m is 15–30; n is 10–30; and Z' is alkyl, aryl or an aralkyl radical and most often methyl; and Z is an alkylene, arylene or an aralkylene radical and most often propylene or ethylene. Preparation and use of these materials are described in U.S. Pat. Nos. 3,505,377; 3,703,489; 3,980,688; and 4,071,483 of which are hereby incorporated by reference. Similar compositions wherein the divalent Z radical is linked to silicon through an oxygen, carbonyl, acetyl, sulfur, nitrogen or carbo nitrogen group are also included.

Non-hydrolyzable surfactants are usually prepared by the platinum catalyzed addition reaction of a siloxane containing silanic hydrogens with a polyether whose chain is end blocked at one end by an alkenyloxy group (e.g., allyloxy) and at the other end by an alkoxy, aryloxy, or aralkyloxy group. Surfactants having a viscosity of at least 50 centistokes are operable and have molecular weights of 300–100,000.

Illustrative of silicone polyethylene oxide/polypropylene oxide block surfactants for use in the invention are the following:

"Silicone Surfactant A" is a polydimethylsiloxane/oxygen linked alkyl terminated polyethylene oxide/polypropylene oxide copolymer having a specific gravity of 1.03 and a viscosity of 1100 centistokes at 25° C. commercially available by Union Carbide as L550.

"Silicone Surfactant B" is a nonhydrolyzable polydimethylsiloxane-carbon linked alkyl terminated polyethylene oxide/polypropylene oxide copolymer having a specific gravity of 1.03 and viscosity of 1200 centistokes at 25° C. commercially available by Union Carbide as L540.

"Silicone Surfactant C" is a nonhydrolyzable polydimethylsiloxane-alkyl terminated polyethylene oxide/polypropylene oxide copolymer having a specific gravity of 1.03 and a viscosity of 1000–1500 centistokes commercially available by Union Carbide as L560.

"Silicone Surfactant D" is a nonhydrolyzable surfactant similar to L560 having a specific gravity of 1.03 and a viscosity of 1000–1500 commercially available by Union Carbide as L-5304.

"Silicone Surfactant E" is a polydimethyl siloxane, polyether copolymer having a specific gravity of 1.035 and viscosity of 1000–1500 and commercially available by Dow Corning as DC-190.

"Silicone Surfactant F" is a polydimethyl siloxane polyether copolymer available from B. F. Goldschmidt as BF-2270 having a viscosity of 1400 centipoise.

"Silicone Surfactant G" is a polydimethyl siloxane polyether copolymer available commercially by General Electric as SF1188.

EXAMPLE 1

1000 Parts liquid diphenylmethane diisocyanate quasi-prepolymer containing 10% low molecular weight glycols (Rubinate ® LF-179, Rubicon Inc.) was mixed with 0.1 parts polydimethylsiloxane-polyoxypropylene/polyoxyethylene block (Silicone Surfactant D) copolymer (Union Carbide Co.—silicone surfactant-L540). To this liquid was added 1 part of "Polysiloxane I". The mold release agent was added to the surfactant containing polyisocyanate liquid under high shear mixing with a Cowles high speed mixer rotating at 2430 rpm. High speed mixing is employed to obtain a fine stable dispersion. The dispersion remained stable until used in molding operations. Similar compositions made without the L-540 surfactant start to gel in less than 24 hours and were not suitable for further use.

Similar compositions made according to the procedure of Example 1 are listed in Table 1.

TABLE 1

| Example No. | "Mold Release Agent Polysiloxane Type"/parts | "Silicone Surfactant Type"/parts | "Polyisocyanate Type" (100 parts) | Stability 20–25° C. (days) |
|---|---|---|---|---|
| 1 | I/1.0 | B/0.1 | 1 | >180 |
| 2 | I/3.0 | B/0.33 | 1 | >180 |
| 3 | I/3.0 | B/0.15 | 1 | >180 |
| 4 | I/6.0 | B/0.66 | 1 | >180 |
| 5 | I/6.0 | B/0.3 | 1 | >180 |
| 6 | I/12.0 | B/0.66 | 1 | >180 |
| 7 | I/15.0 | B/0.23 | 1 | >180 |
| 8 | I/6.0 | C/0.66 | 1 | >180 |
| 9 | I/6.0 | E/0.66 | 1 | >180 |
| 10 | V/6.0 | B/0.66 | 1 | >10 |
| 11 | IV/6.0 | B/0.66 | 1 | >10 |
| 12 | IX/6.0 | B/0.66 | 1 | >10 |
| 13 | I/5.0 | F/0.8 | 5 | >10 |
| 14 | I/5.0 | E/0.8 | 5 | >30 |
| 15 | I/5.0 | D/0.8 | 5 | >30 |
| 16 | I/5.0 | G/0.8 | 5 | >30 |
| 17 | I/5.0 | B/0.8 | 5 | >30 |
| 18 | I/5.0 | C/0.8 | 5 | >30 |
| 19 | I/5.0 | A/0.52 | 5 | >30 |
| 20 | I/5.0 | B/0.66, A/0.13 | 5 | >30 |
| 21 | I/5.0 | C/0.56 | 2 | >180 |
| 22 | I/5.0 | C/0.56 | 9 | >180 |
| 23 | I/5.0 | C/0.56 | 6 | >180 |
| 24 | III/4.5 | C/0.56 | 5 | >180 |
| 25 | IV/4.5 | C/0.56 | 5 | >180 |
| 26 | IX/4.5 | C/0.56 | 5 | >180 |
| 27 | I/6.0 | B/0.66 | 7 | >180 |
| 28 | I/6.0 | B/0.66 | 8 | >180 |

Indications of improved mold release are provided by laboratory techniques wherein 4 mm thick 2.54 cms×15 cms strips of conventional polyurethane RIM formulations are cast on a clean steel surface cured at 48° C. for one minute then peeled off with a metal clip attached to a spring balance. Coatings containing no mold release have release values of ranging from 800–1100 gms/in while typical RIM formulations containing from 0.5–5% by weight of the mold release agents of the invention have mold release values substantially lower. For example a RIM urethane formulation containing the blend of Example 1 gives mold release values of 200–300 grams/inch. While the laboratory peel strength is a good indication of the effectiveness of internal mold release agents their true worth can only be determined in actual commercial scale use in formulations employed in making complicated three dimensional shapes where large cured moldings must be pulled off directly from the mold surface. In the following example the use of the internal mold release blends of the invention in commercial scale RIM application is best demonstrated.

The following examples were run on a standard two component Cinncinati Milacron RIM 90 machine equipped with a heated metal mold for forming an automobile fascia having a surface area of at about 2 sq. meters and 3.68 kilograms in weight. All proportions are expressed in parts by weight unless otherwise specified.

GENERAL PROCEDURE

The polyurethane composition used represent typical RIM two component systems where the "A" component is a composition selected from Table 1. The "B" component is a mixture of a polyether polymer polyol such as (Niax D440) with a chain extender such as ethylene glycol and dibutyl tin dilaurate (Catalyst T-12-M and T Corp.) as the catalyst.

The temperature of the "A" component is maintained at 26° C. and the "B" component at 44° C.

The polyol or "B" component is nucleated with nitrogen under pressure to result in a molded density of 1.05.

The surface of the mold is pretreated with a conventional external mold release wax, XMR-136, supplied by Chem-Trend, Inc. The mold temperature is maintained at 68° C.

Components "A" and "B" are blended in an impingement mixer and dispensed directly into the mold, the cure time is 60 seconds. The mold is then opened and the molding removed. There must be no surface sticking or tearing of the polyurethane, the part should release without the need for undue force.

EXAMPLES A–J

According to the previously described general procedure a series of automobile fascias were made employing various "A" Components which are isocyanate dispersions of polysiloxanes and silicon surfactants. The "A" component of the invention were impingement mixed with typical "B" Components which are polyol blends containing catalysts and in some formulations, fillers at "A Component/B Component" ratios to provide an isocyanate index of 103–105, with a mold temperature of 68° C. with one coating of external mold release.

| "B Components" | Parts by Weight | | | | | | |
|---|---|---|---|---|---|---|---|
| | B-1 | B-2 | B-3 | B-4 | B-5 | B-6 | B-7 |
| Dow Polyol XAS-10771 | 100 | 100 | | | | | |
| Union Carbide Polyol - Niax D442 | | | 81 | 53.66 | 89 | 69 | |
| Union Carbide Polyol - Niax W136 | | | | | | | 100 |
| Ethylene glycol | 16 | 16 | 19 | 12.6 | 11 | 8 | |
| Diethyltoluene diamine | | | | | | | 22.5 |
| Dibutyl Tin Dilaurate Catalyst | .09 | .09 | 00.1 | .07 | .1 | .08 | .15 |
| DABCO-DC-2 Catalyst | .09 | | 00.1 | .07 | .1 | | |
| Catalyst UL28 | | .09 | | | | | |
| Flaked Glass | | | | 33.7 | | | |
| Milled Glass | | 28.9 | | | | 23 | |

The number of molding made from various "A" Component Isocyanate Dispersions from Table 1 are listed in the following Table 2. A cure time of 60 seconds was permitted before mold was opened.

TABLE 2

| Example No. | "A" Component Isocyanate Dispersion of Example No. | "B" Component | Isocyanate Index | Ratio "A"/"B" | Number of Release before Sticking |
|---|---|---|---|---|---|
| Control | "Polyisocyanate 2" | B-1 | 103 | 0.774 | 5 |
| A | 20 | B-1 | 103 | 0.871 | >30 |
| B | 19 | B-2 | 103 | 0.66 | >30 |
| C | 20 | B-3 | 105 | 1.08 | >30 |
| D | 20 | B-5 | 104 | 0.627 | >25 |
| E | 20 | B-6 | 104 | 0.487 | >25 |
| F | 20 | B-5 | 103 | 0.667 | >25 |
| G | 20 | B-4 | 105 | 0.687 | >30 |
| H | 3 | B-7 | 105 | 0.534 | 12 |
| I | 7 | B-7 | 106 | 0.55 | 14 |
| J | 2 | B-7 | 103 | .5 | 10 |

What is claimed is:

1. A stable liquid organic polyisocyanate fluid dispersion for use in preparing reaction injected molded polyurethane resins having improved mold release properties having dispersed therein from 1-15 percent by weight of a polysiloxane mold release agent which consists essentially of 0.5-20 mol percent of $R_aR'_bSiO_{[4-(a+b)]/2}$ units and from 80-99.5 mol percent of $R''_cSiO_{(4-c)/2}$ units where R is an isocyanate reactive organic radical, a has an average value of from 1-3, R' and R" are both non-isocyanate reactive organic radicals, b has an average value of 0-2, a+b is from 1-3, and c has an average value of from 1-3, wherein the ratio of the total molecular weight of said polysiloxane mold release agent to the total number of isocyanate reactive functional groups in said polysiloxane mold release agent ranges from 100-3500, the combined formula weights of all isocyanate reactive organic radicals, R do not exceed 40% of the total molecular weight of said polysiloxane mold release agent, the combined formula weights of all non-isocyanate reactive radicals, R'+R" together do not exceed 40% of the total molecular weight of said polysiloxane mold release additive, the combined formula weights of all the organic radicals R+R'+R" in the molecule together do not exceed 60% of the total molecular weight of the molecule, said polysiloxane mold release agent contains an average of at least two isocyanate reactive functional groups per molecule, at least two of the isocyanate reactive functional groups in each molecule are located on separate organic radicals, R, attached independently to different silicon atoms in said polysiloxane, said isocyanate reactive functional groups (R) are selected from the group consisting of alcohols, phenols, thiols, carboxylic acids, primary or secondary aromatic amines which contain no oxygen and which contain not more than one nitrogen atom attached directly to, in conjugation with, or incorporated within the aromatic ring nucleous, and secondary aliphatic amines wherein at least one of the alkyl carbon atoms bonded directly to the nitrogen atom is not a primary carbon atom, the molecular weight of said polysiloxane mold release agent ranges from 1000 and 30,000, and said polysiloxane mold release agent being substantially insoluble in said liquid polyisocyanate, and from 1-25 percent based on the weight of said polysiloxane mold release agent of a liquid silicone surfactant substantially free of isocyanate reactivity whereby said liquid remains substantially ungelled and fluid up to 25° C.

2. A composition of claim 1 wherein said silicone surfactant has the general formula:

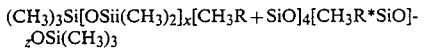

where the value of X, Y or Z vary from 10-1000 and R+ and R* may be the same or different and are radicals selected from the group consisting of an alkyl group, polyalkyl ether group, alkoxyether group, and grafted methoxy, ethoxy, ethylene, styrene, trifluoropropene, allyltetrahydrofurfurylether, allyloxyethyl acetate, acrolein diethylacetal, allylcyanide, allyloxyethyl cyanide, allylmorpholie, and allylchloride groups where the sum of the total formula weight for R+ and R* ranges from 800-40,000 and the polysiloxane block ranges from 15-70% of the molecular weight.

3. A composition of claim 1 wherein said surfactant has the general formula:

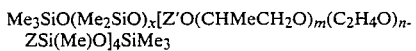

where Me=$CH_3$; x is 42-125; y is 3-15; m is 15-30; n is 10-30; Z' is selected from the group consisting of alkyl, aryl and aralkyl radicals; and Z is selected from the group consisting of alkylene, arylene, and aralkylene radicals.

4. A composition of claim 3 wherein x is 65.6, y is 6.1, Z' is —$CH_3$, Z is —$C_3H_6$—, m is 23, n is 20.2.

5. A composition of claim 1 wherein said polysiloxane has a molecular weight of 2000-15,000.

6. A composition of claim 1 wherein said polysiloxane has a molecular weight of 4000-8000.

7. A composition of claim 1 wherein said polysiloxane has a viscosity of 1-100,000 centistokes.

8. A composition of claim 1 wherein R, R', and R" are organic radicals attached to silicon by carbon to silicon bonds, by carbon-oxygen-silicon bonds, or by carbon-sulfur-silicon bonds.

9. A composition of claim 1 wherein R is selected from the group consisting of R'''—OH, R'''—CHOHCH$_2$OH, R'''—CHOHCH$_3$, R'''—SH, R'''—CH$_2$SH, —R'''—SCH$_2$CO$_2$H wherein R''' is a divalent linking group composed of carbon and hydrogen; carbon, hydrogen, and oxygen; carbon, hydrogen, and sulfur; or carbon, hydrogen, oxygen, and sulfur.

10. A composition of claim 1 wherein R is —CH$_2$CH$_2$CH$_2$O—[CH$_2$CH(CH$_3$)O]$_n$—H where n=1-5.

11. A composition of claim 10 having a hydroxyl equivalent weight of between 500 and 2,000.

12. A composition of claim 10 wherein said polysiloxane has the general formula:

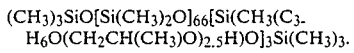

13. A composition of claim 1 wherein said polysiloxane has the general formula:

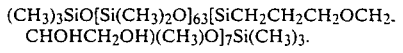

14. A composition of claim 1 wherein said polysiloxane has the general formula:

(CH$_3$)$_3$SiO[Si(CH$_3$)$_2$O]$_{65}$[SiCH$_2$CH$_2$CH$_2$OCH$_2$CHOHCH$_2$OH)(CH$_3$)O]$_5$Si(CH$_3$)$_3$.

15. A composition of claim 1 wherein said polysiloxane has the general formula:

(CH$_3$)$_3$SiO[Si(CH$_3$)$_2$O]$_{56}$[SiCH$_2$CH$_2$CH$_2$OCH$_2$CHOHCH$_2$OH)(CH$_3$)O]$_{14}$Si(CH$_3$)$_3$.

16. A composition of claim 1 wherein said polysiloxane has the general formula:

(CH$_3$)$_3$SiO[Si(CH$_3$)$_2$O]$_{134}$[SiCH$_2$CH$_2$CH$_2$OCH$_2$CHOHCH$_2$OH)(CH$_3$)O]$_{16}$Si(CH$_3$)$_3$.

17. A composition of claim 1 wherein R is CH$_2$CH$_2$SCH$_2$CH$_2$OH.

18. A composition of claim 1 wherein said organic polyisocyanate is an aromatic polyisocyanate.

19. A composition of claim 18 wherein said aromatic polyisocyanate is selected from the group consisting of the isomers of toluene diisocyanate, the isomers of diphenylmethane diisocyanate, and the isomers of methylene bridged diphenylmethane diisocyanate.

20. A composition of claim 19 wherein said diphenylmethane diisocyanate contains minor amounts of uretonimine, carbodiimide or low molecular weight polyol modified diphenylmethane diisocyanate.

21. In the process of reaction injection molding of polyurethane, polyurea, or polyurethaneurea resins which includes the mixing of polyol and/or polyamines, and/or polyolamines with polyisocyanates and catalysts, and the molding and curing of the foregoing ingredients in a metal mold, the improvement which comprises including with said polyisocyanate a composition of claim 1.

22. A process of claim 21 wherein said polyisocyanate is a composition of claim 12.

* * * * *